US012117862B2

(12) United States Patent
Cervi et al.

(10) Patent No.: US 12,117,862 B2
(45) Date of Patent: Oct. 15, 2024

(54) MODULAR CONTROL APPARATUS FOR ACTUATING HYDRAULIC VALVE SYSTEMS

(71) Applicant: WALVOIL S.P.A., Reggio Emilia (IT)

(72) Inventors: Alessandro Cervi, Reggio Emilia (IT); Davide Mesturini, Reggio Emilia (IT); Ulderico Busani, Reggio Emilia (IT); Daniel Poli, Reggio Emilia (IT)

(73) Assignee: WALVOIL S.P.A, Reggio Emilia (IT)

( * ) Notice: Subject to any disclaimer, the term of this patent is extended or adjusted under 35 U.S.C. 154(b) by 305 days.

(21) Appl. No.: 17/602,850

(22) PCT Filed: Apr. 10, 2020

(86) PCT No.: PCT/IB2020/053446
§ 371 (c)(1),
(2) Date: Oct. 11, 2021

(87) PCT Pub. No.: WO2020/208601
PCT Pub. Date: Oct. 15, 2020

(65) Prior Publication Data

US 2022/0163992 A1 May 26, 2022

(30) Foreign Application Priority Data

Apr. 11, 2019 (IT) ........................ 102019000005634

(51) Int. Cl.
*G05G 5/26* (2006.01)
*F15B 13/042* (2006.01)
*G05G 9/047* (2006.01)

(52) U.S. Cl.
CPC ........... *G05G 5/26* (2013.01); *F15B 13/0424* (2013.01); *G05G 9/047* (2013.01);
(Continued)

(58) Field of Classification Search
CPC ..................... G05G 5/26; G05G 9/047; G05G 2009/04718; G05G 2009/04755;
(Continued)

(56) References Cited

U.S. PATENT DOCUMENTS 3,698,415 A * 10/1972 Forster ................ F15B 13/0422 91/434
4,296,773 A * 10/1981 Harshman ........... F15B 13/0422 137/868

(Continued)

FOREIGN PATENT DOCUMENTS

| | | | |
|---|---|---|---|
| EP | 3096197 | A2 | 11/2016 |
| WO | 2008130870 | A1 | 10/2008 |
| WO | 2018159330 | A1 | 9/2018 |

*Primary Examiner* — Craig J Price
*Assistant Examiner* — Andrew J Rost
(74) *Attorney, Agent, or Firm* — Carmel Patent Agency; Robert Ballarini

(57) ABSTRACT

A modular control apparatus for actuating hydraulic valve systems includes an actuating section including a tilting control member and a plurality of control rods provided with a pusher, which interacts with the control member so as to translate the control rods in the longitudinal direction, a sensor section including a plurality of sensor members suitable to detect a movement in the longitudinal direction of said control rods and a blocking section comprising a blocking device that is capable of individually blocking in the longitudinal direction each of said control rods. The actuating section can be alternately connected to the blocking section or to the sensor section so that the sensor section can be directly connected to the actuating section, detecting the longitudinal movement of the control rods also if the blocking section is not present.

13 Claims, 7 Drawing Sheets

(52) U.S. Cl.
CPC ............. *G05G 2009/04718* (2013.01); *G05G 2009/04755* (2013.01); *G05G 2505/00* (2013.01)

(58) Field of Classification Search
CPC ............. G05G 2505/00; F15B 13/0424; F15B 19/005; F15B 13/08; G01D 5/14; F16K 27/003; F16K 27/0281
USPC ........................................................ 137/271
See application file for complete search history.

(56) References Cited

U.S. PATENT DOCUMENTS

| | | | | | |
|---|---|---|---|---|---|
| 4,342,335 | A * | 8/1982 | Reinicker | F16K 11/168 137/868 | |
| 4,461,320 | A * | 7/1984 | Barbagli | F15B 13/0424 137/596.1 | |
| 5,638,866 | A | 6/1997 | Mueller | | |
| 5,868,230 | A * | 2/1999 | Chatterjea | F15B 13/0424 192/12 C | |
| 6,460,639 | B1 * | 10/2002 | Hori | B62D 11/183 180/333 | |
| 6,634,383 | B2 * | 10/2003 | Aarestad | F15B 13/0422 74/528 | |
| 6,932,113 | B1 * | 8/2005 | Kauss | E02F 9/2004 137/636.2 | |
| 7,104,284 | B2 * | 9/2006 | Ligneau | F15B 13/0422 91/426 | |
| 7,562,676 | B2 * | 7/2009 | Boudou | F15B 13/0422 137/636.1 | |
| 8,944,104 | B2 * | 2/2015 | Kauss | F15B 13/0422 137/636.1 | |
| 9,027,597 | B2 * | 5/2015 | Kubo | G05G 5/03 137/625.25 | |
| 11,079,294 | B2 | 8/2021 | Kageyama | | |
| 2006/0169498 | A1 | 8/2006 | Blanco | | |
| 2008/0256941 | A1 * | 10/2008 | Bertolasi | G05G 9/047 60/422 | |
| 2013/0276925 | A1 | 10/2013 | Merletti | | |
| 2018/0107235 | A1 | 4/2018 | Smith | | |

* cited by examiner

MODULAR CONTROL APPARATUS FOR ACTUATING HYDRAULIC VALVE SYSTEMS

FIELD OF THE INVENTION

The present invention relates to a modular control apparatus for actuating hydraulic valve systems, of the type comprising a tilting control member, which controls a plurality of control rods the displacement of which is detected by means of relative sensors.

BACKGROUND

In the technical sector of hydraulic actuations, it is known to use joystick-shaped control systems, i.e., control systems in which a handle that can be tilted in different directions is used for the corresponding directional actuation of a hydraulically operated component.

An example of such use is represented by an operating machine, in which the control joystick is used to move the relative arm.

Possible examples of such joysticks are described in WO2018159330A1, US2006169498A1, US2013276925A1 or WO2008130870A1.

In some applications, the presence of a blocking system capable of maintaining the command given by the user without him necessarily having to maintain the pushing action on the joystick lever, as for example described in EP 3 096 197 and US 2018/107235, may be required.

The blocking systems typically provide that when the lever has reached a limit position, or in any case is close thereto, it remains blocked in this position unless there is an action with a sufficiently high force.

Known blocking devices, however, make the structure of the joystick more complex and are therefore typically used only in high-end applications or in machines that require complex actuations.

However, it is desirable to make more versatile and more suitable solutions available to adapt to the different needs required by the specific applications.

The technical problem underlying the present invention is therefore that of providing a control apparatus, which allows improvement of the known solutions and can at least partially overcome one or more of the identifiable drawbacks in relation to the prior art.

A further object of the present invention is that of providing a control apparatus, which is more versatile and adaptable to specific needs.

It is also an object of the present invention to provide a control apparatus, which has modularity characteristics.

Another object of the present invention is that of providing a control apparatus in which the blocking function is present although a structure is adopted which is on the whole analogous or at least similar to that of the apparatuses that are not provided with this function.

SUMMARY

This problem is solved and these objects are achieved by a modular control apparatus for actuating hydraulic valve systems comprising:

- an actuating section including a tilting control member about a hinging point and a plurality of control rods arranged about the hinging point and provided with a pusher susceptible to interaction with the control member following the oscillation thereof about the hinging point so as to translate the control rods in the longitudinal direction;
- a sensor section including a plurality of sensor members suitable to detect a movement in the longitudinal direction of said control rods; and
- an auxiliary, optional, section comprising a blocking device of the control rods, capable of individually blocking in the longitudinal direction each of said control rods, and/or a haptic device, capable of providing the user of the control device with a feedback as a function of the displacement of the tilting control member, said auxiliary section comprising a first and a second connecting interfaces through which it can be connected to the actuating section and the sensor section, respectively.

The actuating section comprises a third connecting interface through which it can be alternately connected to the auxiliary section or to the sensor section so that the sensor section can be directly connected to the actuating section, detecting the longitudinal movement of the control rods also in the case that the auxiliary section is not present.

According to another aspect, the actuating section, the auxiliary section and the sensor section comprise a respective casing.

Thanks to the presence of different sections and specific connecting interfaces that allow the connection of the sections according to various configurations, it is possible to exploit a series of common components for the realisation of control apparatuses that both include the blocking function and in which this is not expected.

This solution can be implemented, among other things, through a particularly simple structure, requiring the provision of the connecting interfaces provided for the aforesaid connections.

The use of three separate devices, housed in respective casings, allows the components to be stored in the warehouse and assembled according to specific needs.

In this way, a range of different control apparatuses can be made available to the user without the need for structural modifications to the single sections that compose it.

Preferably, the three sections are formed as separate bodies, so that the auxiliary section can be physically removed from the control apparatus, or simply not inserted in the assembly phase of the same, when there is no interest in the use of the auxiliary section.

In some embodiments, the first connecting interface, second connecting interface and third connecting interface are configured in such a way as to achieve a mechanical coupling between the actuating section, the auxiliary section and the sensor section.

According to a further aspect of the invention, the second connecting interface, that is the one through which the auxiliary section connects to the actuating section, is identical to the third connecting interface, that is the one with which the actuating section connects, can be alternately connected either to the auxiliary section or to the sensor section. In this way it is possible to adopt an identical connecting system between the various sections for the benefit of the simplicity of the structure and the ease of realisation thereof.

In one embodiment, the blocking section comprises auxiliary rods that are integral to or that can be made integral to the control rods, the auxiliary rods comprising ends that are suitable to be detected by the sensor section. This feature allows the sensor section to be used indifferently to detect the movement of the control rods or of the auxiliary rods in the case that the blocking section is present.

Preferably, the auxiliary section comprises recesses, in which the control rods can be received and a blocking device located at the recesses configured so as to hold on command the control rods and/or the auxiliary rods in the longitudinal direction. This embodiment allows the blocking section to be made in a compact manner, exploiting the longitudinal extension of the control rods to suitably position the blocking device.

In one embodiment, the blocking device comprises at least one electromagnet and preferably comprises a plurality of electromagnets, each extending about one of the openings through which the control rod can pass, always for the benefit of the simplicity of the structure.

According to yet another aspect of the invention, the control rods and/or the auxiliary rods comprise a hooking member configured so as to couple the control rod to a corresponding auxiliary rod, thus making them integral in the longitudinal direction. Preferably, this hooking member is located at opposite ends of the control rod and of the auxiliary rod, so that they can couple directly with each other following the union between the actuating section and the blocking section.

In some embodiments, the control rods project from said actuating section and are shaped so as to be insertable into respective holes, which are defined in said sensor section, within which the sensor members act to detect the movement in the longitudinal direction of the control rods. This feature allows simplification of the assembly of the control apparatus and to minimize the number of components required to functionally connect the sections. Always for the same purpose, preferably, the hooking member comprises a groove and a corresponding ring, made respectively on the former and the latter of the control rods and the auxiliary rods. According to a preferred embodiment, at one end of the former there is a cavity, which is suitable for holding the end of the latter.

In some embodiments, the auxiliary rods project from said blocking section and are shaped so as to be insertable into holes, which are defined in said sensor section, within which the control rods can also be inserted.

In some embodiments, the connecting interfaces comprising a shaped portion, preferably of said casing.

According to another aspect, the casings can be configured so as to define the shaped portion.

Preferred features of the invention are more generally defined in the dependent claims.

BRIEF DESCRIPTION OF THE DRAWINGS

The features and the advantages of the invention will become clearer from the detailed following description of some of its preferred embodiment examples illustrated, by way of non-limiting example, with reference to the accompanying drawings in which:

FIGS. 4A, 4B and 4C are perspective views, of which FIG. 4C is a section view, of respective actuating, blocking and sensor sections, which represent details of the apparatus according to the present invention.

DETAILED DESCRIPTION OF THE PREFERRED EMBODIMENTS

Figure 1:
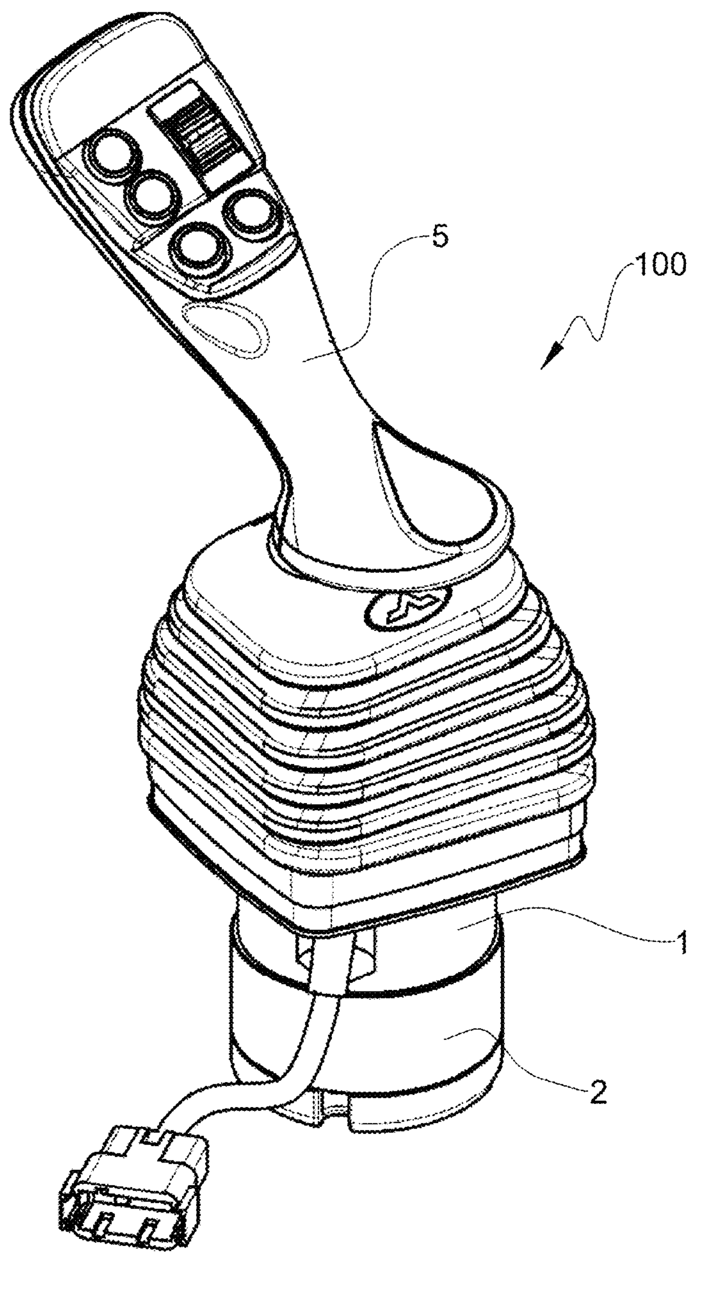
FIG. 1 is a perspective view of a control apparatus according to the present invention with a lever inclined laterally.
Figure 1A:
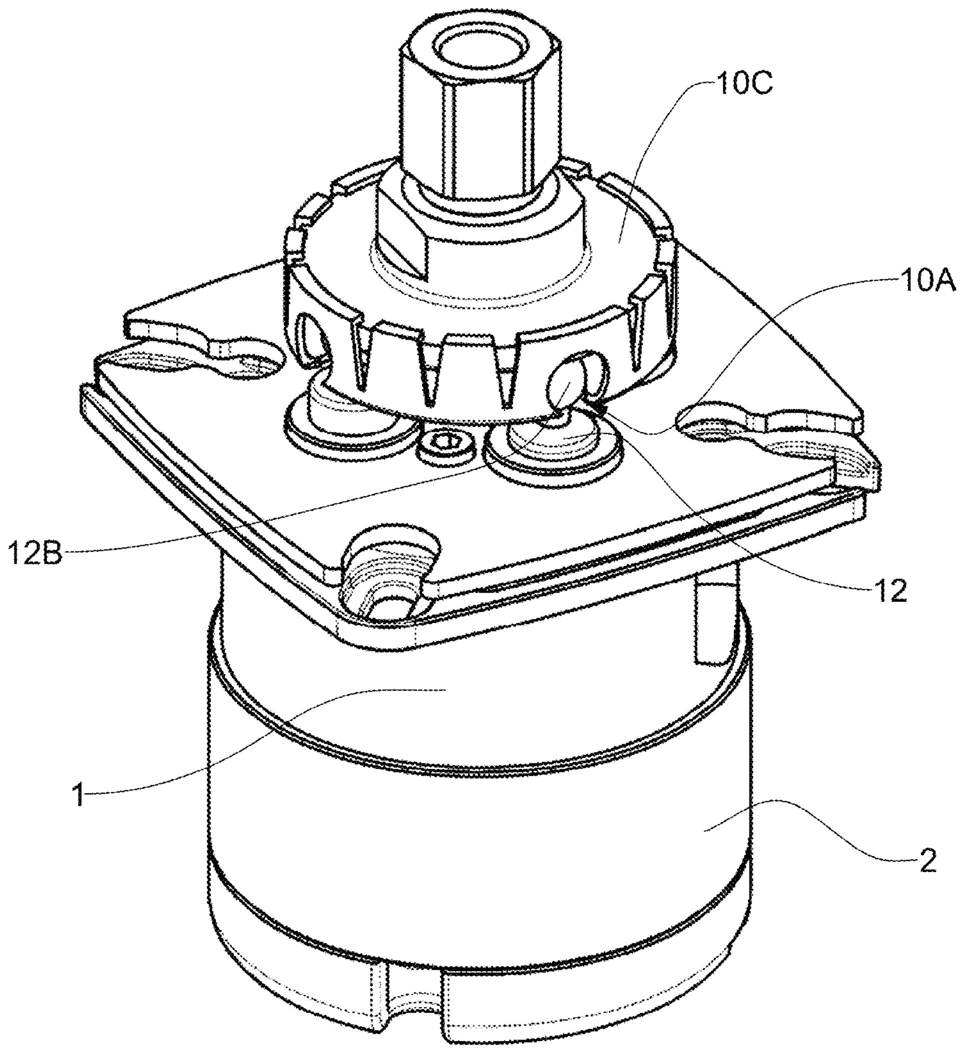
FIG. 1A is a perspective view from the control apparatus of FIG. 1 from which a lever and a cover sleeve have been removed for greater expository clarity.

With reference initially to FIG. 1, 100 indicates overall a control apparatus according to the present invention.

Preferably, the control apparatus according to the present invention finds preferred application in the realisation of joysticks of the heavy-duty type, therefore of the type typically intended for actuations in operating machines.

Figure 5:
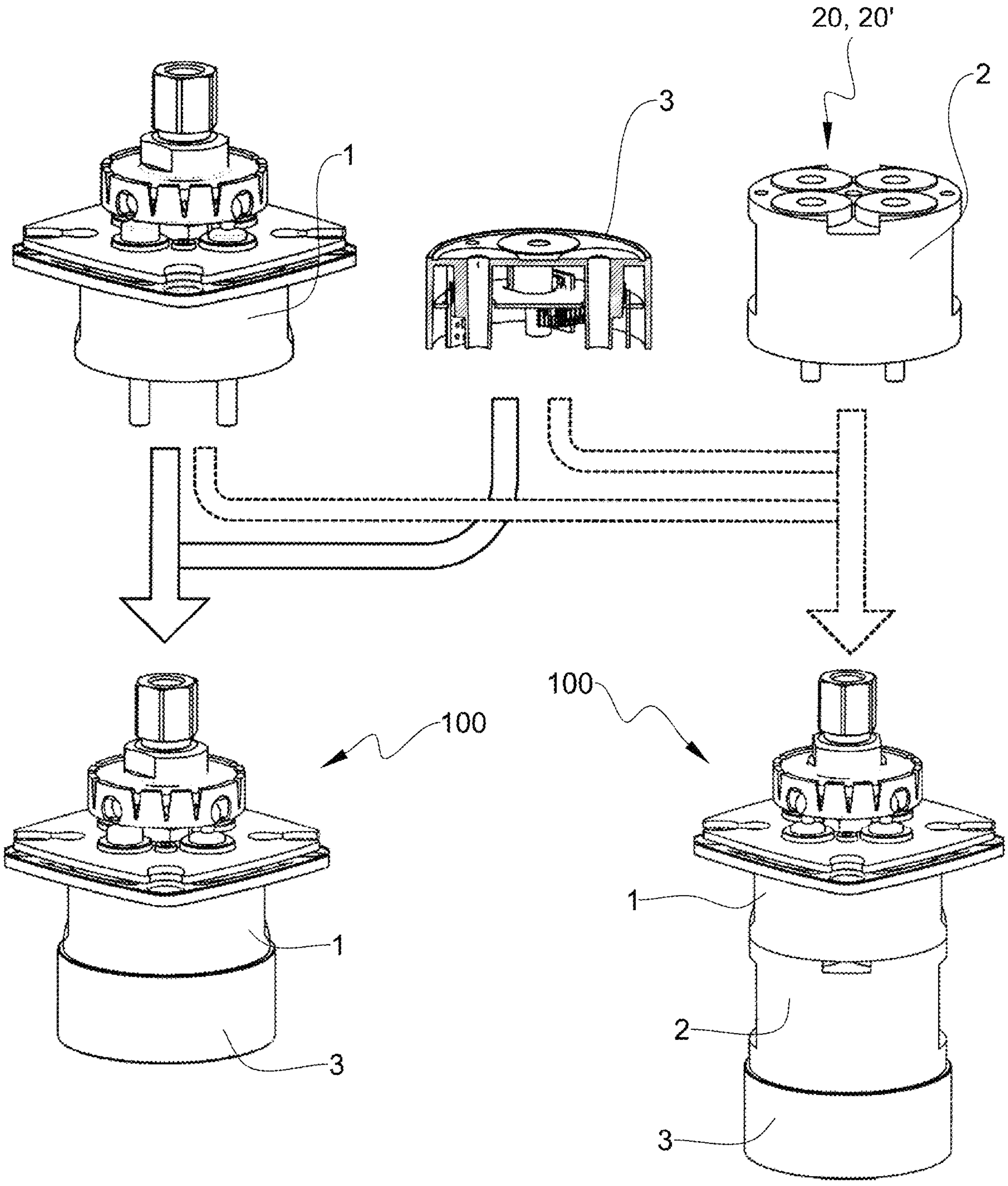
FIG. 5 is a schematic illustration, according to a perspective view, which illustrates different ways of combining the sections represented in FIGS. 4A, 4B and 4C.

As schematically illustrated in FIG. 5, the control apparatus 100 is essentially formed by several sections, which, in a preferred embodiment, can be assembled and stacked together in a pack-like configuration.

Figure 2A:
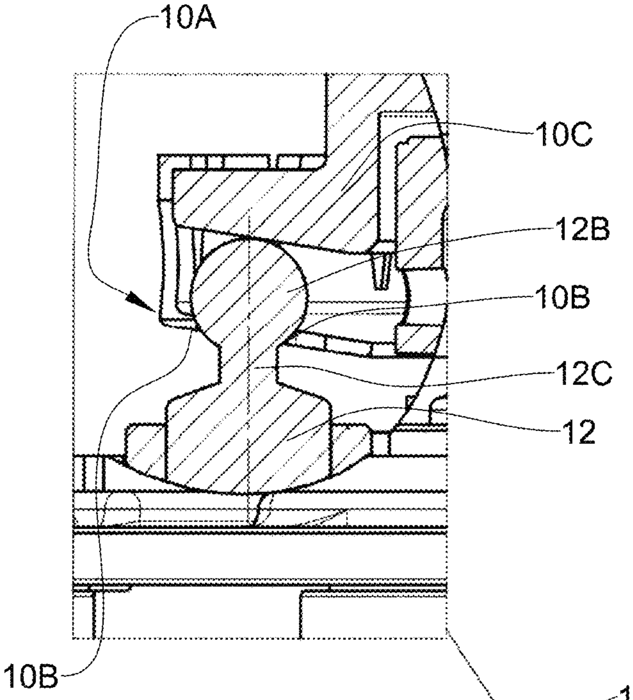
FIGS. 2 and 2A are a lateral section view and a relative detail of the control apparatus of FIG. 1 in the rest position, with some components omitted for illustrative clarity.
Figure 2:
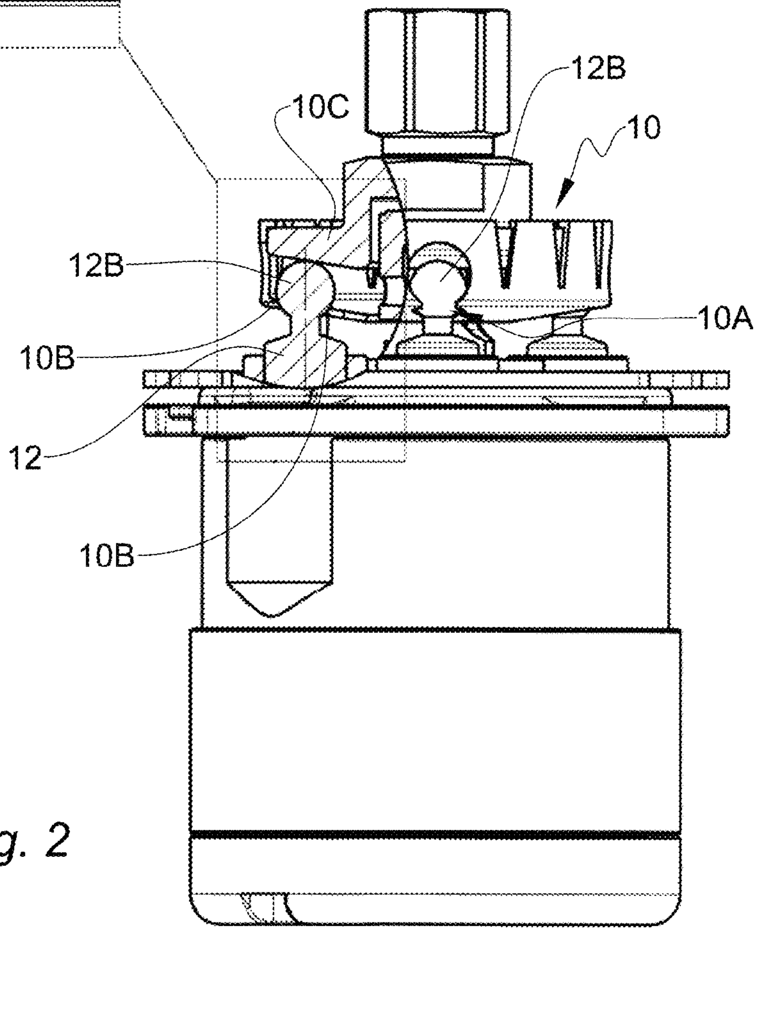

With reference now also to FIG. 2, the apparatus 100 comprises an actuating section 1 including a tilting control member 10 about a hinging point O.

Preferably, the control member 10 is supported by means of a joint of the universal type, that is a joint formed by two perpendicular hinging axes, which therefore allows the oscillation movement about a point described above.

In a preferred embodiment, on the control member 10, for example made in the form of a rigid cap, the characteristics of which will be better illustrated below, a lever 5 is connected, shaped in such a way that it can be grasped by a user. In this way the lever 5 can be easily moved in order to tilt the control member 10 into the required position.

The actuating section 1 further comprises a plurality of control rods 11 arranged about the hinging point O. Preferably, the rods 11 are provided with a pusher 12 susceptible to interaction with the control member 10 so as to translate the control rods in the longitudinal direction X.

In some embodiments, the control member 10 comprises coupling members 10A which allow the rods 11 to be constrained to the control member 10, making them translate in the longitudinal direction X following the oscillation of the control member 10 itself.

The connection between the control member 10 and the pushers 12 is illustrated in an exemplary version in FIGS. 2 and 2A.

With reference to these figures, according to a preferred embodiment, the pushers 12 comprise heads 12B, which form an enlargement with respect to the rod portion 12C on which they are mounted.

The heads 12B are housed in respective seats, forming the coupling member 10A, through which the portion 12C can pass but not the head 12B as a whole. In this way a coupling can be achieved between the head 12B and a respective abutment surface 10B formed on the control member 10.

According to other aspects, the control member 10 can further comprise a blocking body 10C. Preferably, the blocking body 10C can couple with a base portion of the control member 10, for example by snap-fitting, so as to close the heads 12B in a pack-like configuration between the abutment surface 10B and the blocking body 10C.

In this way, the pushers 12, and consequently the rods 11, can follow the movement of the control member 10 in both directions along the longitudinal direction X in two opposite directions, therefore both in extraction and insertion with respect to the actuating section 1.

More generally, a bidirectional constraint between rods 11 and control member 10 can be provided so as to obtain a redundancy in the signal generated following the movement of the rods 11, as will be better illustrated below.

It will however be appreciated that in some embodiments, the actuating section 1 can comprise an elastic member 14 which stresses the rod 11.

In this case, and in general as an alternative to the embodiment shown in the figures, the iteration between the pusher 12 of the rods 11 and the control member 10 can take place by simple contact, following the contact with an abutment surface of control member 10. In some of these variants, the coupling member 10A can be omitted, thanks to the presence of the elastic member.

Preferably, in order to maintain the redundancy characteristic in the signal generated by the rod, it can be provided that the elastic member holds the pusher in contact with the control member also during the extraction phase of the rod 11.

More generally, redundancy can be obtained, in various embodiments, by providing that the pushers 12 are coupled to the control member 10 in such a way that a displacement in a first direction of a rod 11 causes a corresponding displacement of the diametrically opposite rod with respect to the hinging point O in the opposite direction along the longitudinal direction X.

Figure 4A:
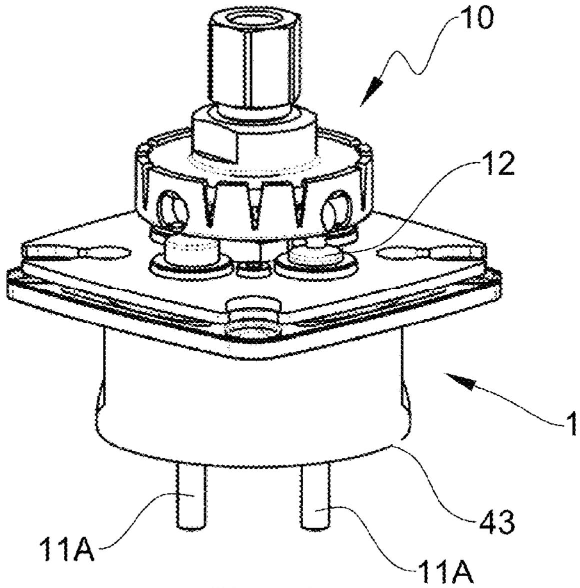

With reference now to FIG. 4A, the control rods 11 comprise a respective end section 11A projecting from the actuating section 1. In one embodiment, the end 11A, or more generally the rod, is shaped so as to be insertable into a respective hole 31 defined in a sensor section 3.

Inside the sensor section 3 there are sensor members 30 capable of detecting the movement in the longitudinal direction of the control rods 11. By way of example, these sensors 30 may be of the Hall effect type but it will be understood that sensors of other type, both of the mechanical and electromechanical type, may also be provided.

The movement detected by the sensor members 30 is then transmitted to the hydraulic system, in a manner known per se, to suitably control the desired valve actuations.

The apparatus according to the present invention can also optionally comprise an auxiliary section 2 capable of providing additional and, precisely, auxiliary functions to the control apparatus.

Preferably, the auxiliary section 2 is configured to individually block in the longitudinal direction X each of said control rods 11, by means of a suitable blocking device 20 which will be illustrated in greater detail below.

Figure 4B:
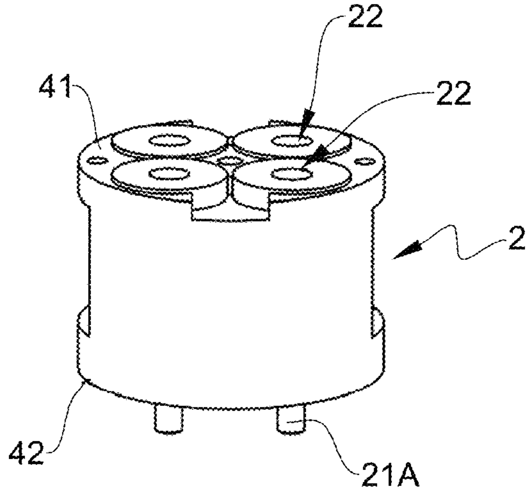
Figure 4C:
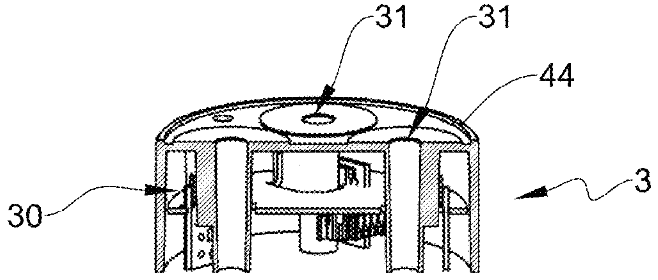

A further embodiment of the auxiliary section 2 is also represented by a haptic system, in which a haptic device 20' is used, the latter illustrated schematically, only for conceptual purposes, in FIG. 4. The haptic device 20' may be capable of providing the user of the control apparatus with a feedback as a function of the displacement of the tilting control member, for example by imparting a force capable of opposing a further displacement of the control member, or by requiring more force for the displacement thereof in the presence of predetermined conditions. It is however evident that different types of auxiliary sections may also be provided, for example that combine the blocking function with the haptic one.

Below, reference will be made to an embodiment in which the auxiliary section 2 has a blocking function and, for this reason, it will also be referred to as the blocking section 2, in any case it being understood that the present invention also finds application in the case of a haptic section.

The blocking device, or the haptic device, is optional in the sense that it may or may not be included in the apparatus of the present invention based on specific needs. In other words, the auxiliary section 2 is configured as an autonomous section, which can be inserted between the actuating section 1 and the sensor section 3 as a function of specific needs.

This is achieved through a suitable connection system between the sections which enables making the actuating section 1, the auxiliary section 2 and the sensor section 3 separate units, so that the auxiliary section 2 can be physically removed from the control apparatus, or not inserted in an assembly phase of the same.

As in fact illustrated in FIG. 3 and clarified in FIG. 5, the auxiliary section 2 comprises a first connecting interface 41 and a second connecting interface 42 through which it can be connected to the actuating section 1 and to the sensor section 3, respectively.

In turn, the actuating section 1 comprises a third connecting interface 43 through which it can be alternately connected to the auxiliary section 2 or to the sensor section 3.

On the basis of a further aspect of the invention, the sensor section will in turn comprise a connecting interface 44 alternately connectable to the second or third interface, that is, to the actuating section or to the auxiliary section.

In light of the configuration described above, it is evident that the sensor section 3 can be directly connected to the actuating section 1, detecting the longitudinal movement of the control rods 11 also in the case that the auxiliary section 2 is not present.

This allows in fact obtainment of two different variants of the control apparatus of the present invention, without the need to radically modify the components used, thus making the apparatus modular.

In some embodiments, the second connecting interface 42 is identical to the third connecting interface 43.

Figure 3A:
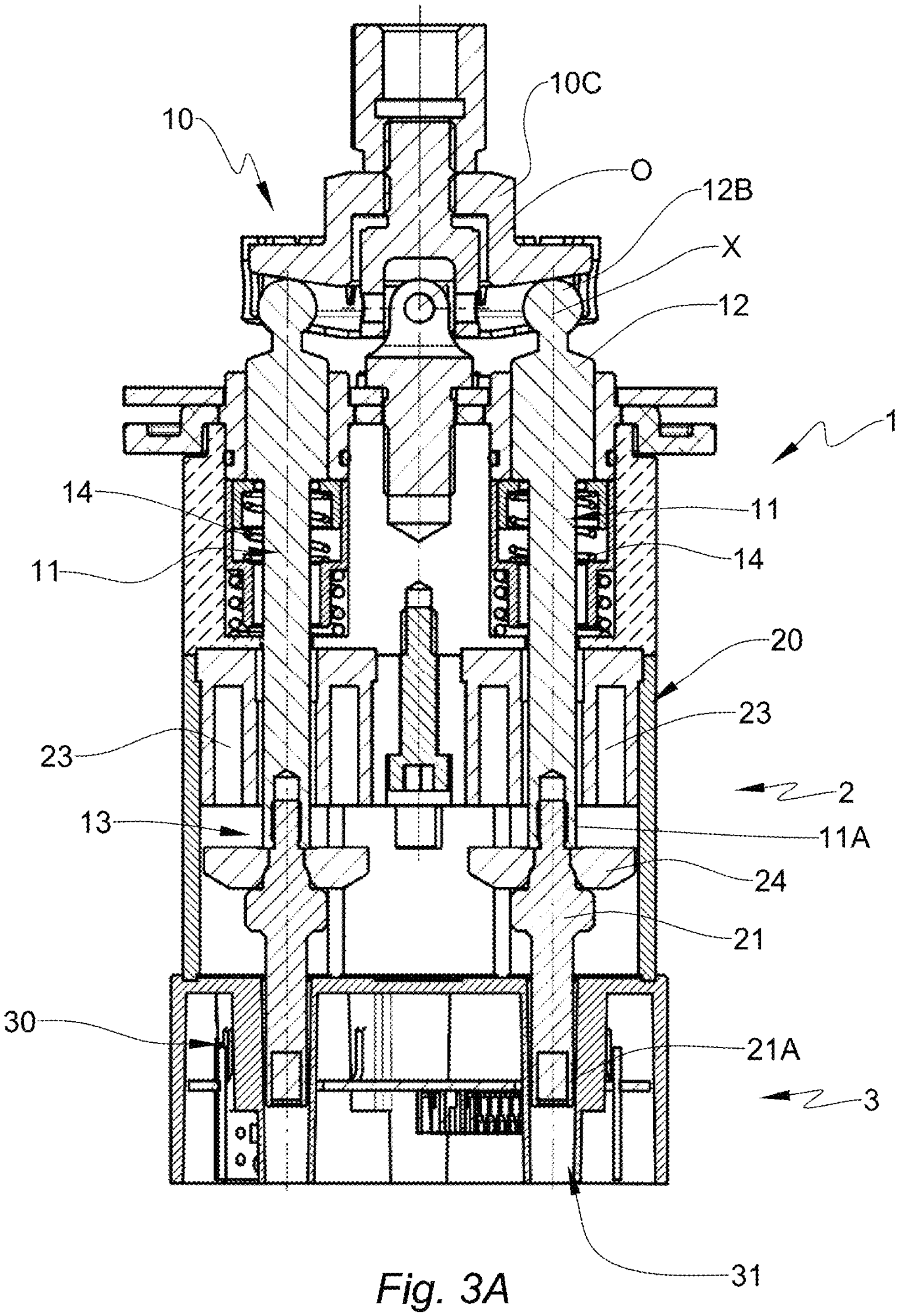
FIGS. 3A and 3B are a section lateral view and a section perspective view of the control apparatus of FIG. 1 with the lever in the rest position and in the inclined position, respectively.
Figure 3B:
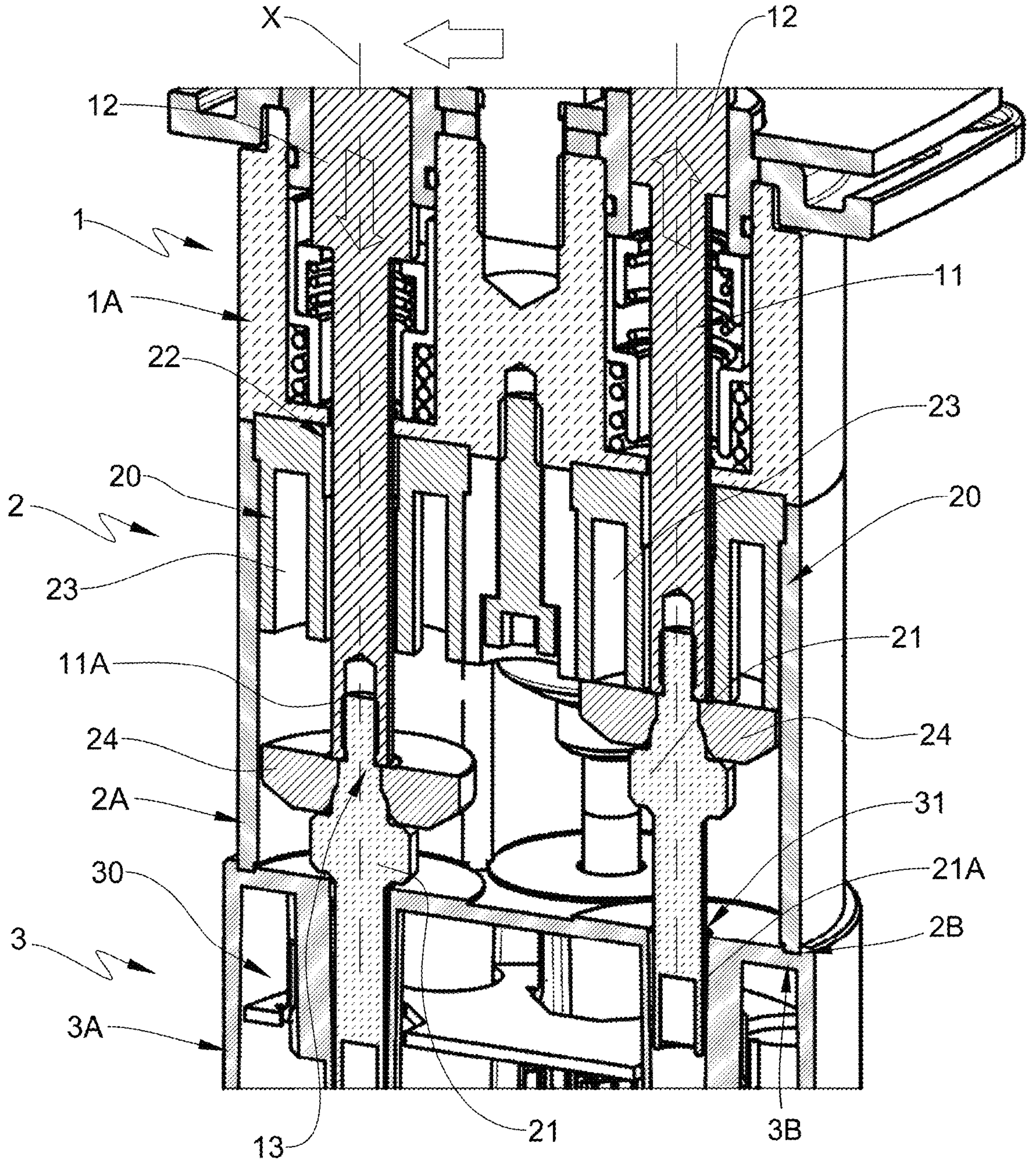

Preferably, the actuating section 1, auxiliary section 2 and sensor section 3 comprise a respective casing 1A, 2A, 3A, as illustrated in FIG. 3B.

In some embodiments, the connecting interfaces 41, 42, 43 may comprise a shaped portion of the casing.

The shaped portion can be defined by a shaped edge 2B of the casing of the casings, engageable in a counter-shaped slot 3B, as for example can be seen in FIG. 3B, at the connecting interface between the auxiliary section 2 and the sensor section 3. It is however evident that different embodiments of the shaped portion may also be provided, which may be formed by holes or seats in which to engage screws or pins or simply by a specific arrangement of the casing in order to allow the assembly between the different sections, also by using additional connecting members.

In one embodiment, the auxiliary section 2 comprises auxiliary rods 21 which can be connected to the control rods 11 in such a way as to make them integral along the aforesaid longitudinal direction X. For this purpose, the actuating section 1 and/or the auxiliary section 2 can have a special hooking member 13.

By way of example, the hooking member 13 can be formed by a groove and a corresponding ring, made respectively on the former and the latter of the control rods 11 and of the auxiliary rods 21 for mutual engagement.

According to a preferred embodiment, to make the connection between the rods 11 and 21 more precise, at one end of the former there is a cavity which is suitable for holding the end of the latter. Preferably, the groove and the ring are made at the cavity and at the end or vice versa.

In one embodiment, also the auxiliary rods 21 comprise ends 21A, preferably also provided with a further magnetic member, suitable for being detected by the sensor members 30, by inserting them into the same holes 31 used for the control rods 11. In other words, if the auxiliary section 2 is present, the ends 21A are inserted into the holes 31 for detecting their position whereas, if this is not used, the ends 11A of the control rods 11 will be inserted into the holes 31.

With reference now also to FIG. 4B, according to a preferred embodiment, the auxiliary section 2 comprises recesses 22 in which the control rods 11 can be received.

With reference now again to FIGS. 2 and 3A, B an example of embodiment of the blocking device 20 will be described.

As can be seen from FIGS. 3A, B, the blocking device 20 is preferably located at the recesses 22 and configured so as to hold on command the control rods 11 and/or the auxiliary rods 21 in the longitudinal direction.

In some embodiments, the blocking device 20 comprises at least one electromagnet 23 and preferably comprises a plurality of electromagnets 23, each extending about one of said recesses 22.

The electromagnet can therefore act on the control rod 11 blocking the translation thereof in the longitudinal direction. In one embodiment this takes place by using a plate 24 fixed to the auxiliary rods 21. The plate 24 can be subject to attraction by the electromagnet 23, thus preventing displacements of the rod, and therefore of the control member, until the action of the electromagnet is interrupted or until a sufficient stress is imparted to the lever. This advantageously allows both to be able to unblock the system manually, by operating with sufficient force, and automatically, in the event of an emergency situation.

It will also be appreciated that the electromagnet is configured in such a way that, in use, this is arranged above the plate 24, as can be seen from the example of FIG. 3B. More generally, the blocking device 20 is configured so as to generate a magnetic attraction suitable for attracting the respective control rod 11 towards the extraction direction.

Consequently, in light of the redundancy in the movements of the rods 11 provided in the apparatus of the present invention, the blocking of the rod, which performs the extraction movement, takes place. In this regard, as highlighted above, following the movement of the lever 5 in one direction, the simultaneous movement of two diametrically opposite rods takes place, one in the longitudinal direction in the insertion direction and the other one in the opposite extraction direction. Thanks to the configuration described above, the blocking action takes place on the rod moved in the extraction direction, with the other rod being, on the contrary, moved away from the magnetic member 23.

This allows the electromagnet to be held in a remote position with respect to the sensor members 30, thus preventing them from being disturbed by the presence of the electromagnet 23.

It is however evident that blocking devices of a different type, for example mechanical ones, can also be used. For this purpose, a seat can be provided in the control rod, which can be engaged in a respective abutment member.

By providing that the abutment member is stressed towards the rod but that it can be moved away therefrom if sufficient force is acting, it is possible to obtain a solution similar to that described above with reference to the use of an electromagnetic blocking device.

The invention therefore solves the proposed problem, while at the same time achieving a plurality of advantages, including the possibility of obtaining a modular control apparatus capable of operating with the same mechanical and electronic components both in case it is necessary to include a blocking function or the haptic function, and in the case that this is not required.

Even the overall structure of the apparatus can easily adapt to the different configurations since the connecting interfaces make the sections easily interchangeable with each other.

The invention claimed is:

1. A modular control apparatus for actuating hydraulic valve systems comprising:

an actuating section including a tilting control member about a hinging point and a plurality of control rods arranged about the hinging point and provided with a pusher configured to interact with the control member as a result of an oscillation thereof about the hinging point so as to translate the control rods in a longitudinal direction;

a sensor section including a plurality of sensor members for detecting a movement in the longitudinal direction of said control rods;

an auxiliary section comprising a blocking device, capable of individually blocking in the longitudinal direction each of said control rods, or a haptic device, capable of providing the user of the control apparatus with a feedback as a function of the displacement of the tilting control member, said auxiliary section comprising a first and a second connecting interfaces through which said auxiliary section can be connected to the actuating section and the sensor section, respectively;

wherein said actuating section comprises a third connecting interface through which said actuating section can be alternately connected to the auxiliary section or to the sensor section so that the sensor section can be directly connected to the actuating section, detecting the longitudinal movement of the control rods also if the auxiliary section is not present, said second connecting interface being identical to said third connecting interface;

wherein the actuating section, the auxiliary section and the sensor section comprise a respective casing.

2. The modular control apparatus according to claim 1, wherein said first connecting interface, second connecting interface and third connecting interface are configured in such a way as to achieve a mechanical coupling between the actuating section, the auxiliary section and the sensor section.

3. The modular control apparatus according to claim 1, wherein the actuating section, the auxiliary section and the sensor section are formed as separate units, so that the auxiliary section can be physically removed from the control apparatus, or not inserted in an assembly phase of the same.

4. The modular control apparatus according to claim 1, wherein the auxiliary section comprises auxiliary rods that are integral to or that can be made integral to the control rods in said longitudinal direction, said auxiliary rods comprising ends that are detectable by the sensor members.

5. The modular control apparatus according to claim 4, wherein the auxiliary section comprises recesses in which the control rods can be received, said blocking device being located at the recesses and configured so as to hold on command the control rods and/or the auxiliary rods in the longitudinal direction.

6. The modular control apparatus according to claim 4, wherein said control rods and/or said auxiliary rods comprise a hooking member configured so as to couple the control rod to one of the auxiliary rods, thus making them integral in the longitudinal direction.

7. The modular control apparatus according to claim 4, wherein said control rods project from said actuating section and are shaped so as to be insertable into respective holes, which are defined in said sensor section, within which the sensor members act to detect the movement in the longitudinal direction of the control rods when a blocking section is not present; and wherein said auxiliary rods project from said auxiliary section and are shaped so as to be insertable into the holes defined in said sensor section.

8. The modular control apparatus according to claim 1, wherein the blocking device comprises at least one electromagnet.

9. The modular control apparatus according to claim 8, wherein the blocking device is configured so as to generate a magnetic attraction that is suitable to attract the control rod towards an extraction direction.

10. The modular control apparatus according to claim 1, wherein said control rods project from said actuating section and are shaped so as to be insertable into respective holes, which are defined in said sensor section, within which the sensor members act to detect the movement in the longitudinal direction of the control rods when the blocking section is not present.

11. The modular control apparatus according to claim 1, wherein the connecting interfaces comprising a shaped portion.

12. The modular control apparatus according to claim 11, wherein said casings are configured so as to define a shaped portion.

13. The modular control apparatus according to claim 1, wherein said rods are arranged in pairs that are diametrically opposite with respect to the hinging point, said pushers being coupled to said control member so that a displacement in the longitudinal direction in a first direction of a rod causes a corresponding displacement of a diametrically opposite rod in an opposite direction of said longitudinal direction.

* * * * *